Patented July 23, 1929.

1,721,610

UNITED STATES PATENT OFFICE.

CHARLES TAYLOR WALTER, OF CHICAGO, ILLINOIS, ASSIGNOR TO SWIFT & COMPANY, OF CHICAGO, ILLINOIS, A CORPORATION OF ILLINOIS.

METHOD OF DEPILATING CARCASSES.

No Drawing.   Application filed September 12, 1927.   Serial No. 219,174.

This invention relates to the treatment of carcasses in preparing them for the market, and the main object of the invention is to provide an improved method of depilating the carcass.

This improved method of depilation may be employed in the treatment of any kind of carcass but it has its main application in the treatment of hog carcasses.

Heretofore, in the depilation of a hog carcass, it was common practice to use a scraping and beating machine to remove the greater part of the hair. The carcass was then scraped by hand and also singed in an attempt to remove the remaining hairs. Such prior methods of depilation were objectionable, because the scraping and singeing failed to remove the roots of the hair which frequently detracted from the appearance of the cuts of meat and reduced the selling price as much as one and even two cents per pound. During certain months of the year, known to the trade as the "hard hair" months, it is especially difficult to depilate the hog carcasses by scraping and singeing.

The difficulties encountered in the depilation of carcasses by the aforementioned methods are overcome in the use of this improved method which consists in coating the carcass with a hot congealable liquid and then, after the coating has solidified by cooling, stripping it with the embedded hair from the carcass.

Various temperature controlled substances may be used for making the coating, but it has been found that pitch, resin, and paraffin produce very good results when used in a mixture of about sixty-five parts resin, thirty parts pitch, and five parts paraffin.

The coating may be applied in various ways as by painting, spraying or dipping.

In carrying out this improved method, the carcasses may be suspended from an overhead track by the customary trolleys, which are well known in the art, and which convey the carcasses to the different points or stations where various operations are performed and inspections made. The carcasses are first conveyed to a point where they are subjected to a spray of scalding water which tends to loosen the roots of the hair. If desired, the cascasses may then be acted upon by a beating and scraping machine for the removal of the greater part of the hair.

The entire carcass is then dipped into a bath of molten pitch, resin, and paraffin for applying a congealable coating. After leaving the coating tank, the carcass is subjected to a cold water spray for quickly hardening the coating. After the coating has solidified it may be readily stripped by hand from the carcass.

Any hair remaining on the carcass, when the latter is dipped in the tank, becomes embedded in the coating and when the coating is stripped from the carcass it carries with it the embedded hairs and leaves the hide clean and smooth. The stripped coating may then be melted and the hairs removed by a filtering process so as to permit the pitch, resin and paraffin to be used repeatedly.

It is to be understood that I use the word "depilating" and its variants in a broad sense to include removal of any and all ordinary dermal excrescences or growths such as hair, bristles, feathers, fuzz, down, pinfeathers and the like occurring on the carcasses of food animals. I use the word "congeal" and its variants only in the sense of hardening by drop in temperature.

Although this invention is here particularly described in its preferred embodiment, it will be understood that the various steps of the method may be modified by the omission or alteration of details and substitution of ingredients, without departing from the spirit of this invention as defined by the following claims.

I claim:

1. The method of depilating a carcass which consists in coating the carcass with a congealable liquid, chilling the coating to cause it to solidify, and then stripping the coating with the embedded hairs from the carcass.

2. The method of depilating a carcass which consists in scalding the carcass, coating it with a congealable liquid, chilling the coating to cause it to solidify, and then stripping the coating with the embedded hairs from the carcass.

3. The method of depilating a carcass which consists in coating the carcass with a congealable liquid, chilling the coating with water to cause it to solidify, and then stripping the coating with the embedded hairs from the carcass.

4. The method of depilating a carcass which consists in scalding the carcass, coating it with a liquid including pitch, chilling the coating to cause it to solidify, and then stripping the coating with the embedded hairs from the carcass.

5. The method of depilating a carcass which consists in scalding the carcass, coating it with a liquid including pitch and resin, chilling the coating to cause it to solidify, and then stripping the coating with the embedded hairs from the carcass.

6. The method of depilating a carcass which consists in dipping it in a bath of congealable liquid to apply a coating thereto, chilling the coating to cause it to solidify, and then stripping the coating with the embedded hairs from the carcass.

7. The method of depilating a carcass which consists in coating the carcass with a congealable liquid including pitch, resin and paraffin, chilling the coating to cause it to solidify, and then stripping the coating with the embedded hairs from the carcass.

8. The method of depilating a carcass which consists in scalding the carcass, then coating the carcass with a congealable liquid including pitch, resin, and paraffin, chilling the coating to cause it to solidify, and then stripping the coating with the embedded hairs from the carcass.

9. The method of depilating a carcass which consists in scalding it, dipping the carcass in a liquid bath including molten pitch about thirty parts, resin about sixty-five parts and paraffin about five parts, to apply a congealable coating thereto, chilling the coating with water, and then stripping the coating with the embedded hairs from the carcass.

10. The method of depilating carcasses which consists in coating the same with a congealable liquid, chilling the coating to cause it to solidify, stripping the coating with the embedded hairs from the carcass, melting the coating, and then separating the molten material from the hairs for reuse.

11. The herein described method of dressing carcasses, consisting in coating the same with melted waxy and adhesive material, causing said material to congeal, and finally removing the congealed waxy and adhesive material and with it hair and extraneous material.

Signed at Chicago this 25th day of August, 1927.

CHARLES TAYLOR WALTER.